United States Patent Office 2,776,112
Patented Jan. 1, 1957

2,776,112
METHOD OF DRILLING WELLS

William T. Ilfrey, New Orleans, La., and Charles L. Prokop, Houston, Tex., assignors, by mesne assignments, to Esso Research and Engineering Company, Elizabeth, N. J., a corporation of Delaware No Drawing. Application September 30, 1954, Serial No. 459,519

8 Claims. (Cl. 255—1.8)

The present invention is directed to a method for drilling wells. More particularly, the invention is directed to drilling wells with a drilling fluid which forms a filter cake on the walls of the borehole. More particularly, the invention is directed to drilling oil and gas wells in which a stable filter cake is formed on the walls of the borehole.

The present invention may be briefly described as a method for drilling wells in which a hollow drill stem having a drill bit attached thereto is rotated to form a borehole in the earth's surface. The feature of the present invention comprises circulating a drilling fluid during the rotation of the drill stem down the hollow drill stem and out through eyes in the drill bit and then upwardly in the borehole around the drill stem to deposit on the walls of the borehole a thin, water-reactive filter cake.

The drilling fluid which deposits a thin, water-reactive filter cake on the walls of the borehole comprises a slurry of cement in a hydrocarbon and a filtration reducing amount of Bentone. This material will deposit on the walls of the borehole and when water comes into contact therewith, such as formation or interstitial water, the slurry will set up by contact of deposited cement solids with the water. The filter cake may be caused to set up by forcing water therethrough.

The present invention also includes the withdrawal of the drill stem after deposition of the filter cake, as set out supra, and then placing a well casing in the borehole and finally a cement slurry in an aqueous medium is forced down the casing and up the annulus between the casing and the filter cake on the walls of the borehole to cement the casing in the borehole. The filter cake deposited from the oil-slurry of cement and Bentone improves the cementation of casing since a satisfactory bond may be obtained between the filter cake and the water base cement.

The hydrocarbon employed in the method may suitably be crude petroleum and fractions thereof; for example, the fractions may be a heavy naphtha, such as one boiling from about 300° to 600° F., kerosene, diesel oil, light lubricating oil fractions, and the like.

The cement employed in the present invention may suitably be Portland cement but may include other cementing materials, such as pozzolana and lime mixture and sand and lime mixture, which may be especially useful in deep well cementing. It is anticipated that plaster of Paris, and the like may be used in shallow wells and for special jobs.

The cement may be used in amounts in the range from about 50 to about 700 lbs. per bbl. of oil with good results being obtained in amounts ranging from about 100 to about 600 lbs. per bbl. of oil.

The Bentone employed in the present invention may be used in amounts from about 2 to about 10 pounds per barrel of oil.

Bentone is the reaction product of organic bases with bentonite. The reaction is a base exchange reaction. Bentone may be prepared by treating a water slurry of high-grade sodium bentonite with one of the larger quaternary ammonium complexes, for example the water soluble salts, such as octadecyl-ammonium chloride or dioctadecylammonium chloride, and the like. An ion exchange reaction takes place to produce a flocculated organophilic bentonite. This product, commonly called a Bentone, is recovered by filtering, washing, drying, and re-grinding. A description of the Bentones may be found in Chemical Engineering, March 1952, pages 226 to 230.

It may be desirable in the practice of the present invention to use effective amounts in the range of about 3 pounds per barrel of oil or less of a solvation agent. The solvation agent employed in the practice of the present invention is used in the sense of the solvation agent referred to in the paper "Organophilic bentonites. Swelling in organic liquids," by John W. Jordan, The Journal of Physical and Colloid Chemistry, vol. 53, No. 2, February 1949, and in the article "Organophilic bentonites. II—Organic liquid gels," by J. W. Jordan, B. J. Hook and C. M. Finlayson, The Journal of Physical and Colloid Chemistry, vol. 54, No. 8, November 1950. Thus as the oil and Bentone are mixed, the oil moves into the interstitial spaces of the Bentone aggregate causing the Bentone particles to swell; the principal function of the solvation agent may be to speed up the movement of the oil into the interstitial spaces. The solvation agent may suitably be an aliphatic alcohol, such as methyl alcohol, ethyl alcohol, propyl and butyl alcohols and the like. As examples of other suitable solvation agents may be ethylene glycol monomethyl ether, diethylene glycol monoethyl ether, the ketones, such as acetone, methyl ethyl ketone and other ketones of the same homologous series.

It may also be desirable under some circumstances to employ effective amounts in the range of about 3 pounds per barrel of oil or less of a dispersing agent to thin the composition in the practice of the present invention and dispersing agents, such as the metallic soaps of the fatty acids as exemplified by lead naphthenate, copper stearate, lead oleate, cobalt oleate, and other heavy metal salts of the fatty acids may be used.

As the Bentone swells, the attraction between Bentone aggregates increases, the slurry tends to thicken and the viscosity and gel strength to increase; if this change is sufficiently large that the slurry becomes difficult to handle, it may be controlled by the introduction of a heavy metal salt of fatty acid which may be adsorbed on the Bentone-oil aggregates; thus these heavy metal salts and fatty acids act as dispersing agents in the present invention.

In practicing the present invention for drilling oil and/or gas wells, and the like, a slurry of the cement, Bentone, and oil is circulated down the hollow drill stem and out the eyes of the drill bit, such as one of the fishtail or rock bit type. As the bit is rotated the hole is drilled and the drilling fluid consisting of the slurry of cement, Bentone and oil is circulated down the hollow drill stem and upwards through the annulus between the drill stem and the walls of the borehole. This circulation results in the deposition of a thin, water-reactive filter cake on the walls of the borehole. This filter cake reacts with formation or interstitial water in the formation to form a relatively strong impervious layer on the walls of the borehole. Thus the loss of the drilling fluid to the formation is minimized or substantially completely avoided and the wall of the borehole is stabilized.

Although preferably the filter cake is set by contact with formation or interstitial water, it is within the purview of our invention to place water in the borehole to cause the cement to set up. This may be accomplished by alternative replacing at least a portion of the slurry of cement, oil and Bentone with water and circulating the water down the drill stem and up the annulus between the borehole and the drill stem. In these situations, it will also be necessary to maintain a pressure differential from the borehole into the formation.

After the borehole has been drilled and the filter cake formed on the walls of the borehole the drill stem is withdrawn and casing run into the hole. A water base cement, such as Portland cement and water, which may contain additives as desired, is then flowed down the casing and forced up into the annulus between the casing and the wall of the borehole on which the filter cake is deposited. This causes a good cement job because the filter cake formed on the borehole is essentially cement and the water base cement may easily bond thereto.

In operating with the drilling fluid of the present invention, the oil in the drilling fluid filters out into the formation and leaves cement solids deposited in contact with the walls of the borehole. These cement solids when contacted with water which will filter through the filter cake cause a setting up of the filter cake. The permeability of the filter cake will decrease and the strength of the filter cake will increase as the cement strength develops. In other words, as hydration starts, strength develops in the cement and the permeability of the filter cake decreases.

When water is used to replace the drilling fluid, it is contemplated that the water may have surface active agents, such as those that promote water wetting, added thereto in effective amounts of about 3 pounds per barrel of water or less to hasten the setting of the cementing particles. As soon as the cement in the filter cake begins to set, the water flow through the filter cake into the formation is diminished and strength develops in the mass to form a complete job.

The invention will be further illustrated by the following examples in which compositions of drilling fluids were made up having desirable properties for use in the present invention. These compositions are set out in the following table in which the fluid properties of the cement and comments thereon are given:

(3) Sufficient solution from the drilling fluid filters through the conventional mud cake deposited on a permeable formation to displace the natural formation fluids from such a large area that it is difficult to identify these natural fluids and/or to maintain a satisfactory control of the drilling fluid;

(4) Difficulty is encountered in obtaining a satisfactory primary cement job especially on casing set in high-angle holes where use cannot be made satisfactorily of wall scratchers to remove the conventional mud cake.

In the present invention these problems are solved since a filter cake comprised of cement solids is deposited on the walls of the borehole by filtration of oil into the formations traversed by the borehole. The drilling fluids employed in the present invention do not wet with water the formations traversed and a thin, water-reactive filter cake is deposited from the slurry employed in the present invention on the walls of the hole. This filter cake reacts with formation water or water introduced into the wellbore, as described, minimizing, reducing and/or eliminating entirely loss of drilling fluid to thief formations or zones where lost circulation may be encountered. In other words, the borehole is stabilized. In addition, cement jobs, where the casing is set as the drilling proceeds, are of improved strength because the normal water-base cements will bond to the filter cake deposited from the slurry consisting of or comprising cement, hydrocarbon, and filtration reducing amounts of Bentone.

As set out supra, the drilling fluids of the present invention are prepared by dispersing Bentone into an oil, of the nature given before, in the presence of a solvation agent, such as an aliphatic alcohol and the like, which stabilizes the suspension of Bentone in the oil. The mixture of slurry is stirred for a time ranging from a few minutes up to several hours and an appropriate amount of cement and dispersing agent of the nature set out supra may be added. A stirring time for the mixture of oil and Bentone of approximately 1 hour gives good results.

The filter cake on the walls of the borehole is formed

*Table*

| Fluid Composition | | | | Fluid Properties and Remarks |
|---|---|---|---|---|
| Oil, cc. | Bentone, gms. | Methanol, cc. | Cement, gms. | |
| Diesel—345 | 0 | 0 | 250 | Settles rapidly. Fluid loss 203 cc. in 2.5 mins. |
| Do | 10 | 3.5 | 250 | Wt. 10.5 lbs./gal.; Vis. 12.5 cps. plastic; yield point 7 lbs./100 sq. ft.; fluid loss 60 cc. API. |
| Do | 10 | ¹ 3.5 | 500 | Wt. 12.9 lbs./gal.; Vis. 35 cps. plastic; yield point 20 lbs./100 sq. ft.; fluid loss 89 cc. API; filter cake will not set when immersed in water; will set when water forced through cake. |
| Crude—345 | 10 | 3.5 | 250 | Fluid loss 9.0 cc. API. Cake sets if water forced through cake after deposition. |
| Do | 10 | ² 3.5 | 250 | Wt. 11.2 lbs./gal.; Vis. 107 cps. plastic; yield point 23 #/100 sq. ft.; fluid loss 10.0 cc. API. Cake sets if immersed in water (when filtered for 5 days at 100 p. s. i. and 140° F. against water saturated sand bottom ⅛″ of cake sets). |

¹ +½ cc. lead naphthanate.
² +2 gms. polyoxyethylene lauryl alcohol.

From these several compositions it will be seen that the drilling fluid comprising oil, Bentone, and cement exhibited desirable fluid properties which will contribute to the formation of a filter cake on the walls of the borehole.

The present invention is quite useful and solves many problems in present day drilling operations. The problems encountered in drilling operations include the following:

(1) The water in conventional drilling fluid wets the formation with a resultant interference with drilling and/or production;

(2) The walls of the borehole are not sufficiently strong to withstand the pressure exerted by the drilling fluid with consequent breakdown of the walls and the formation;

in the following manner: the pressure in the borehole is greater than the pressure in a given permeable formation; thus the liquid phase of the drilling fluid filters or begins to migrate into the formation forming a filter cake of Bentone and cement solids on the walls of the borehole. This filter cake sets to a hard, impervious mass when contacted with water.

This application contains matter which is common to an application filed September 30, 1954, for Bryan E. Morgan and Charles L. Prokop, Serial No. 459,520, and entitled "Cementing of Wells."

The nature and objects of the present invention having been completely described and illustrated, what we wish to claim as new and useful and to secure by Letters Patent is:

1. A method for drilling a well in which a hollow drill stem having a drill bit attached thereto is rotated to form a borehole in the earth's surface which comprises circulating a drilling fluid comprising a slurry of cement in a hydrocarbon and an amount of the reaction product resulting from treating a water slurry of high-grade sodium bentonite with one of the larger quaternary ammonium complexes down said drill stem and out through eyes in said drill bit and then upwardly in said borehole around said drill stem to deposit a thin, water-reactive filter cake on the walls of said borehole, said cement, hydrocarbon, and reaction product being present in said slurry in sufficient amounts to form said filter cake, said cement being selected from the group consisting of Portland cement; pozzolana and lime mixture; sand and lime mixture; and plaster of Paris.

2. A method for drilling a well in which a hollow drill stem having a drill bit attached thereto is rotated to form a borehole in the earth's surface which comprises circulating a drilling fluid comprising a slurry of cement in a hydrocarbon and an amount of the reaction product resulting from treating a water slurry of a high-grade sodium bentonite with one of the larger quaternary ammonium complexes down said drill stem and out through eyes in said drill bit and then upwardly in said borehole around said drill stem to deposit a thin, water-reactive filter cake on the walls of said borehole, said cement and said reaction product being present in amounts in the range between 50 and 700 pounds and in the range between 2 and 10 pounds, respectively, per barrel of oil, said cement being selected from the group consisting of Portland cement; pozzolana and lime mixture; sand and lime mixture; and plaster of Paris.

3. A method in accordance wtih claim 2 in which the drilling fluid contains a solvation agent for said reaction product.

4. A method in accordance with claim 2 in which the drilling fluid contains a dispersing agent for said reaction product.

5. A method in accordance with claim 2 in which the drilling fluid contains effective amounts of a solvation agent for said reaction product and effective amounts of a dispersing agent.

6. A method for drilling a well in which a hollow drill stem having a drill bit attached thereto is rotated to form a borehole in the earth's surface which comprises circulating a drilling fluid comprising a first slurry of cement in a hydrocarbon and an amount of the reaction product resulting from treating a water slurry of high-grade sodium bentonite with one of the larger quaternary ammonium complexes down said drill stem and out through eyes in said drill bit and then upwardly in said borehole around said drill stem to deposit a thin, water-reactive filter cake on the walls of said borehole, removing said drill stem from said borehole, placing a well casing in said borehole, and forcing a second cement slurry of Portland cement and water down said casing and up the annulus between the casing and the filter cake on the walls of said borehole to cement said casing in said borehole, said first slurry containing cement and said reaction product in amounts in the range between 50 and 700 pounds and in the range between 2 and 10 pounds, respectively, per barrel of oil, said cement being selected from the group consisting of Portland cement; pozzolana and lime mixture; sand and lime mixture; and plaster of Paris.

7. A method in accordance with claim 6 in which the drilling fluid contains a solvation agent for said reaction product.

8. A method in accordance with claim 6 in which the drilling fluid contains a dispersing agent for said reaction product.

References Cited in the file of this patent

UNITED STATES PATENTS

| | | |
|---|---|---|
| 2,065,512 | Cannon | Dec. 29, 1936 |
| 2,380,156 | Dobson et al. | July 10, 1945 |
| 2,531,812 | Hauser | Nov. 28, 1950 |
| 2,582,459 | Salathiel | Jan. 15, 1952 |